United States Patent [19]
Vajs et al.

[11] Patent Number: 4,803,799
[45] Date of Patent: Feb. 14, 1989

[54] MOUSE AND RAT TRAP

[75] Inventors: Lubomir Vajs; Helena Vajs, both of Toronto, Canada

[73] Assignee: H.L. International Marketing Corporation, Scarborough, Canada

[21] Appl. No.: 17,597

[22] Filed: Feb. 24, 1987

Related U.S. Application Data

[63] Continuation-in-part of Ser. No. 838,325, Mar. 11, 1986, Pat. No. 4,665,644.

[51] Int. Cl.4 .............................................. A01M 23/26
[52] U.S. Cl. ....................................................... 43/82
[58] Field of Search ................... 43/77, 81, 85, 61, 63, 43/58

[56] References Cited

U.S. PATENT DOCUMENTS

| | | | |
|---|---|---|---|
| 1,080,623 | 12/1913 | Brorby | 43/81 |
| 1,422,049 | 7/1922 | Gould | 43/82 |
| 2,174,929 | 10/1939 | Slutz | 43/83 |
| 2,209,522 | 7/1940 | Houtsinger | 43/83 |
| 3,968,589 | 7/1976 | Basham | 43/81 |
| 4,366,642 | 1/1983 | Gardner | 43/88 |
| 4,578,893 | 4/1986 | Wickenberg | 43/81 |
| 4,665,644 | 5/1987 | Vajs | 43/82 |

*Primary Examiner*—Gene P. Crosby

[57] ABSTRACT

A molded plastic mouse or rat trap uses three separate molded pieces, namely a base, a striker and an actuator, which are releasably connected, in combination with metal springs for biasing the striker to a closed position. The components cooperate to provide a trap which is easier to operate. According to one embodiment, an extension spring is used to bias the trap to a closed position and in the set position, the spring force is primarily carried by the striker and base. Such an arrangement increases the sensitivity of the actuator, as only a small load is carried by the surfaces of the actuator and striker, maintaining the striker in the set position.

8 Claims, 7 Drawing Sheets

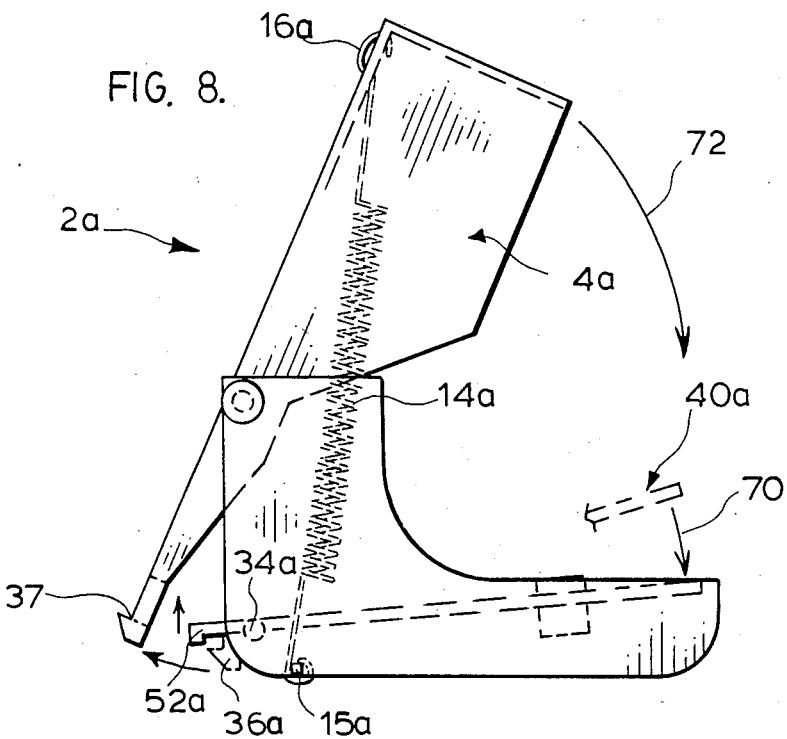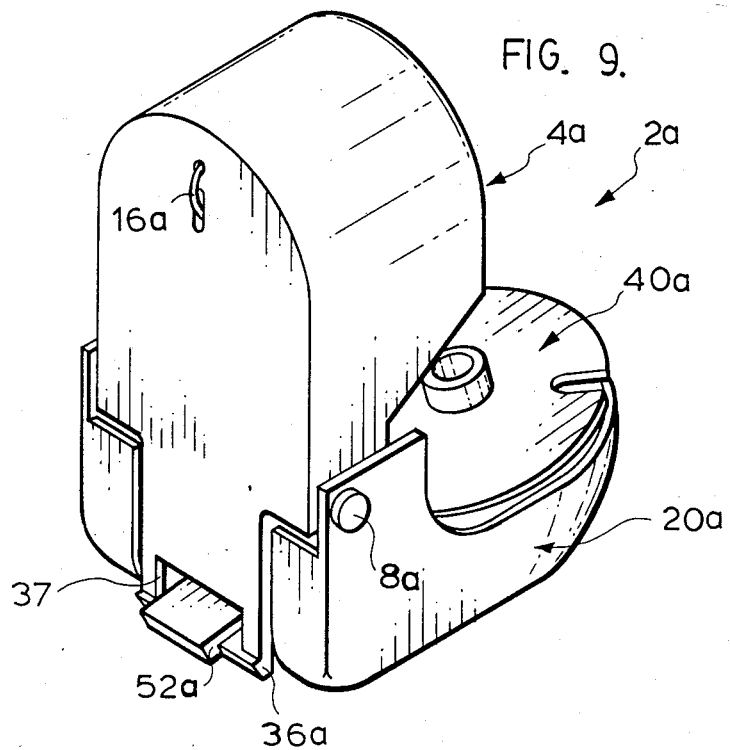

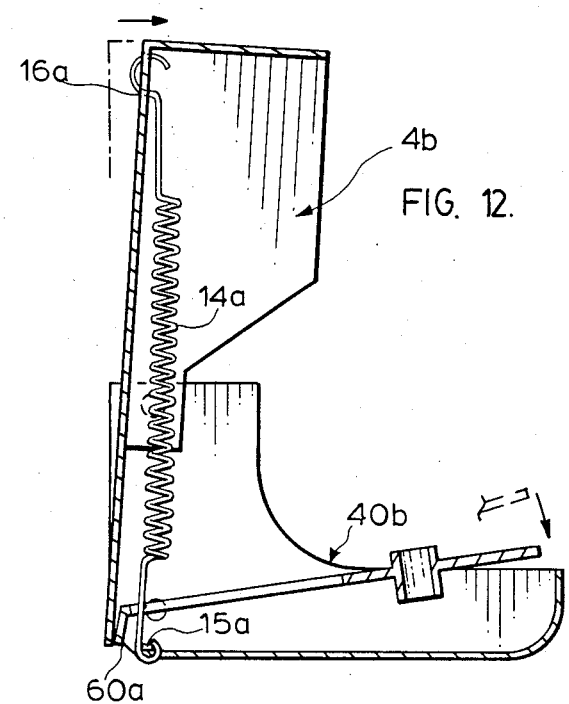
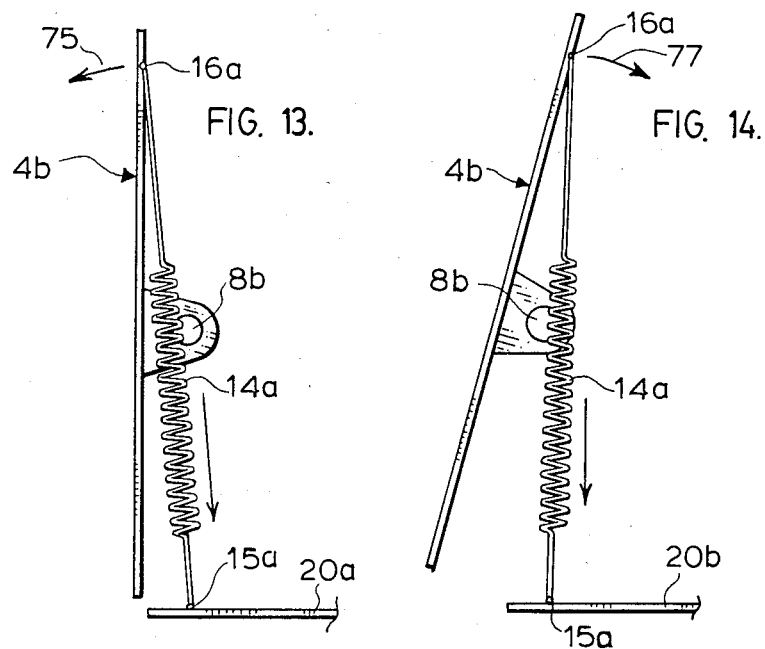

MOUSE AND RAT TRAP

This is a continuation in part of application Ser. No. 838,325 for MOUSE AND RAT TRAP filed Mar. 11, 1986 by Lubomir Vajs and Helena Vajs, now U.S. Pat. No. 4,665,644.

FIELD OF THE INVENTION

The present invention relates to mouse and rat traps and particularly traps of an improved structure which are generally easier to use and of improved appearance.

Mouse traps have been in use for many years, and a host of different designs have been proposed. The most common mouse and rat trap is the wood base version having a wire striker biased by a torsion spring, with the striker moving through approximately 180° to a separate set position and held there by a wire actuator.

More recently, a disposable mouse trap has been proposed in Canadian Pat. No. 1,139,562 which is made of a sheet-type material which is cut and folded in a particular manner with both the striker base and actuator being intergal and basically cut from, or a portion, cut from the sheet material. This trap has an elastic band biasing means for causing the structure to move rapidly to a forward portion of the base, and in so doing killing the mouse.

A slightly different version of the trap described in the above Canadian Patent has been disclosed, and is made of a molded plastic material where the striker is a separate molded piece having a shaft means either side of the striker rotatably received within the base. Again, this trap is biased by an elastic band.

The problems associated with many of the prior art traps is that these traps are somewhat awkward to set and there is the possibility that the trap will inadvertently be released, possibly causing damage to the hand of the user if inappropriately positioned. In some prior art proposals, remote setting means are used and the wire striker is completely enclosed within a housing, such that the user need not concern themselves with respect to gripping the trap as the striker and actual trap mechanism is located within the housing. A port is provided in to the housing to allow entry of the mouse. This approach seems somewhat extreme, when one considers that a trap is often a disposable item as there is a great reluctance to remove the mouse from the trap and sterlize the trap for reuse. Generally, all mouse traps are fairly inexpensive and a large number of people prefer to treat them as a disposable item.

SUMMARY OF THE INVENTION

According to the present invention, a trap, the type for killing mice or rats, uses a molded plastic base which hingedly secures a striker at an elevated position. The striker is of a molded plastic and includes journal means either side thereof received in appropriately sized apertures in the base adjacent upper corner areas. A helical extension spring is secured to the forward portion of the striker and to the base at a position such that the forward portion, said journal means and said base position are generally aligned when the striker is in the set position, with the spring expanded for urging said striker to a non-operative position in engagement with the forward portion of the base. This arrangement ensures that the major force of the spring is carried by the journal means and the base portion when the striker is in the set position, and not by the striker and an actuator alone. An actuator is hingedly secured to the base and movable to a position for maintaining the striker in the set position and releases the striker when depressed to allow the striker to move to the non-maintaining position under the influence of the spring.

According to an aspect of the invention, a mouse or rat trap, is proposed which has a base, a striker hingedly secured to the base at an elevated position and an extension spring means in engagement with the base and the striker, urging the striker to a striking position near the front end of the base. An actuator is pivotally secured to the base intermediate its length, with one end of the actuator extending beyond said base opposite said striking position for cooperation with the striker to releasably retain the striker in a set position, removed from said striking position and adapted to release said striker when depressed at the forward end of the actuator. The striker extends rearwardly of the base and is movable through an angle of approximately 90° past a portion of the actuator, which passes through an aperture in the striker. Depression of the portion of the actuator extending through the striker serves to set the striker and retain it until such time as the forward end of the actuator is depressed. This trap provides a simple arrangement for setting of the trap where the user positions his hand under the base and at the rear of the striker, whereby there is no danger of having fingers in a position, which if the striker is released, may cause damage. In effect, the striker is shaped to cooperate with the actuator, whereby the person's motion to set the striker will also result in the actuator passing through an aperture in the striker and thereafter the actuator is almost automatically pressed against the lower part of the striker to effect setting of the striker.

BRIEF DESCRIPTION OF THE DRAWINGS

Preferred embodiments of the invention are shown in the drawings wherein:

FIG. 8 is a side elevation of the modified trap showing release of the striker;

FIG. 9 is a perspective view of the modified trap showing the rear thereof;

FIG. 12 shows a modified version of the trap where the striker moves past the center position such that the extension spring initially does not urge it to forward position; and FIGS. 13 and 14 are side elevations showing the relationship between the striker and the base and the various hinge points to accomplish the modified structure of FIG. 12.

DETAILED DESCRIPTION OF THE PREFERRED EMBODIMENT

Figure 1:
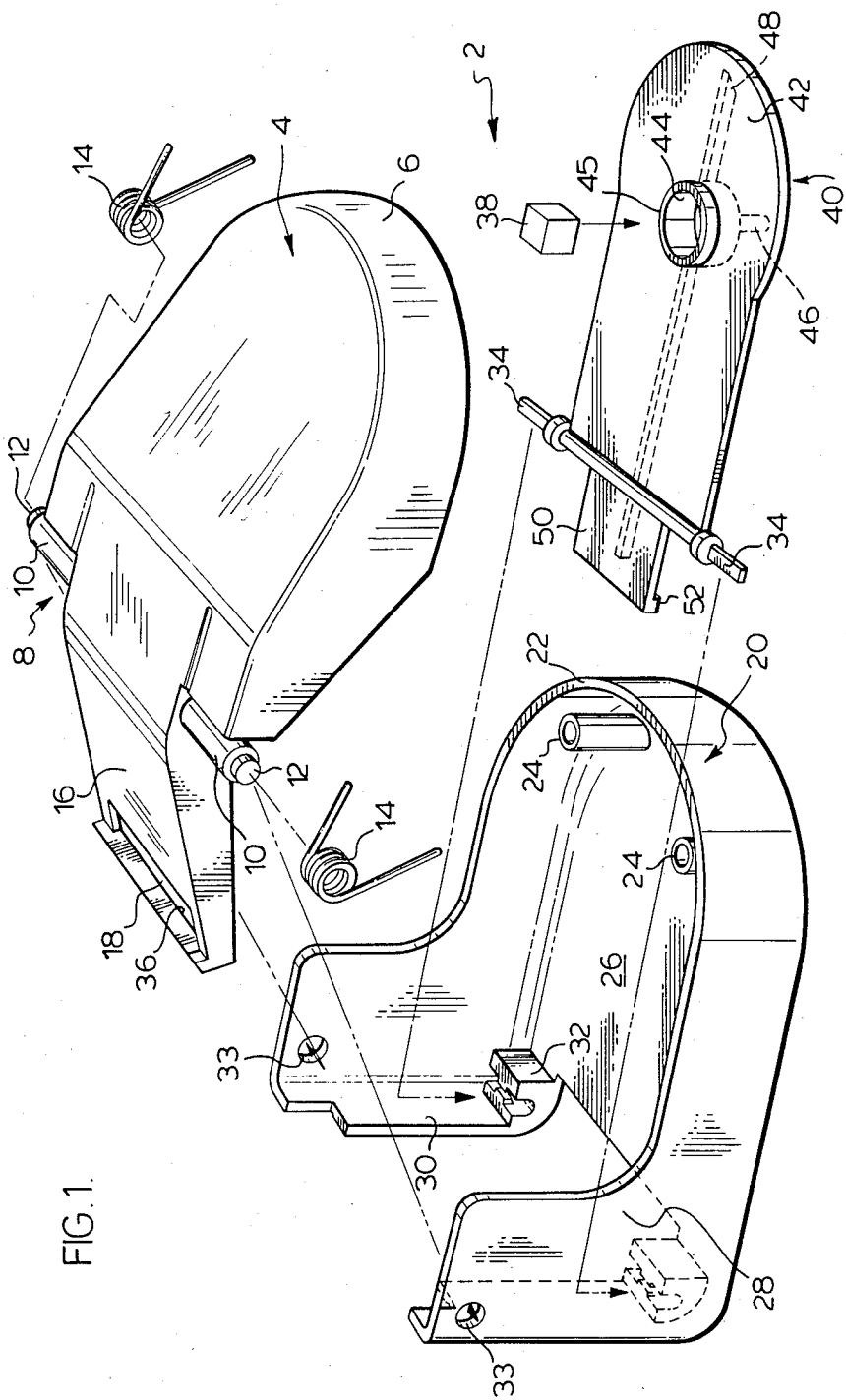
FIG. 1 is an exploded perspective view of the trap.

The trap generally shown as 2 in the drawings is suitable for catching a mouse or rat or other small type animal and is designed to kill the same.

The trap shown is for mice and a larger, stronger version is required for rats. For example, the rat version would be larger and would have substantially stronger springs. For simplicity the invention will be described with respect to the mouse trap version, however, the overall structure and cooperation of components work satisfactorily for the larger rat version.

The striker 4, has a downwardly extending striking edge 6 adjacent the forward portion of the striker and is biased by torsion springs 14 received on journals 8 and particularly by the major cylindrical section 10 of each journal. The trap preferrably has two such torsion springs 14, although it does work satisfactory with one spring. A minor cylindrical section 12 is provided on each journal 8 and is adapted to be rotatably received within apertures 33 of the base 20. The striker has a rearwardly extending portion 16 which is depressed in order to set the trap. Adjacent the freeend of this rear portion 16, a slot-like aperture 18 is provided which cooperates with the rearward portion 50 of the actuator 40. This slot 18 is partially defined by the lip region 36 at the lower edge of aperture 18. This lip region 36 will cooperate with lip region 52 of the actuator 40.

The base 20 has a forward edge 22 for cooperating the striking edge 6 of the striker, and act as the active surfaces which will result in the animal being killed. The base 20 of the trap has a full floor portion 26 and at the rear thereof bearing-type blocks 32 are provided for receiving the stub shafts 34 of the actuator 40. At the forward end of the base, stop posts 24 are provided which limit the downward movement of the striker 4. The upper surface of these posts 24 engage the striking edge 6 to thereby determine an end position of the striker.

Figure 2:
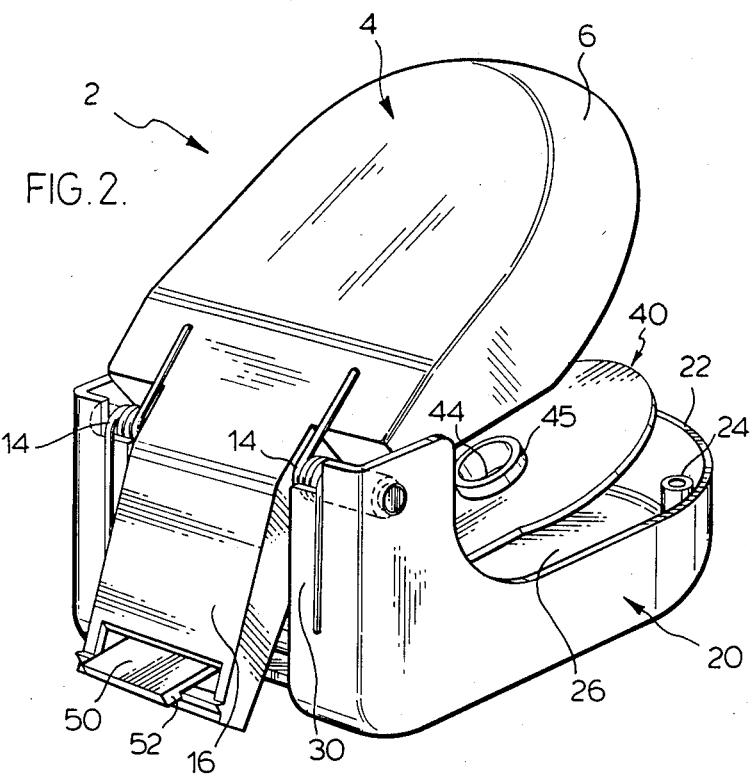
FIG. 2 is a perspective view of the trap.
Figure 3:
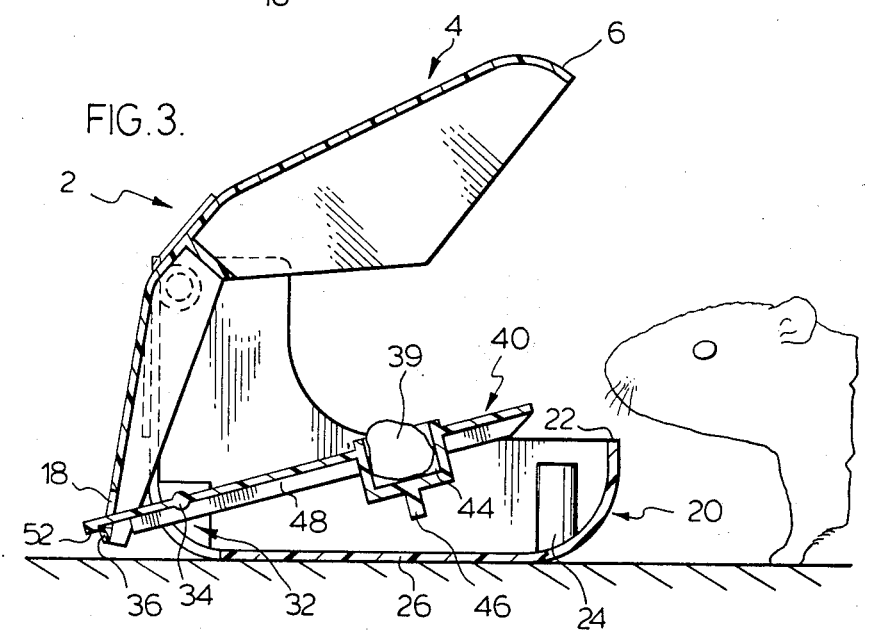
FIGS. 3 through 5 are side sections through the trap showing its operation.
Figure 4:
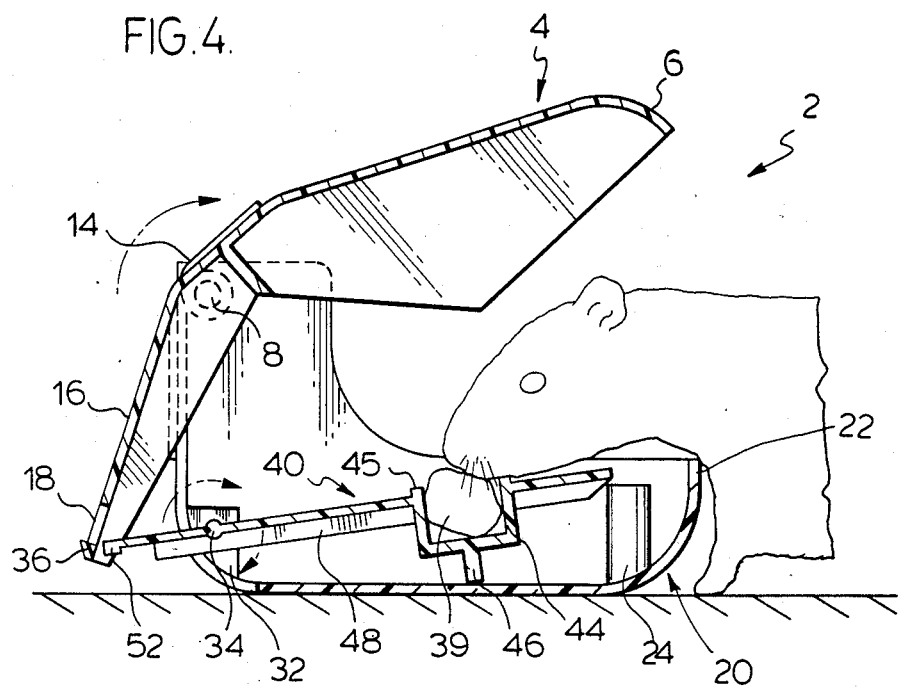
Figure 5:
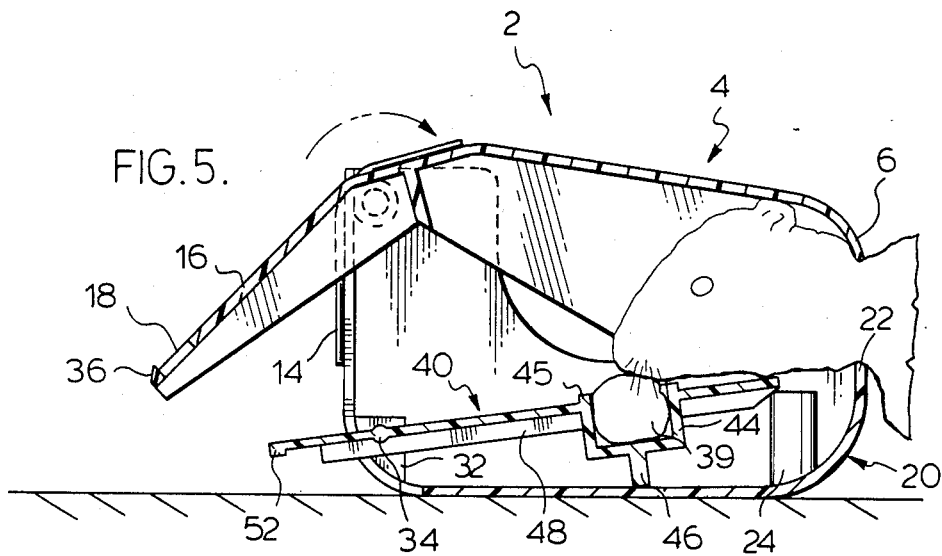

The actuator 40 has a front portion 42 which includes the bait recess area 44 having a raised lip region 45 thereabout. A cube permanent bait 38 is sized to snuggly engage bait recess 44. The corners of the cube shape bait engage the walls of the circular recess 44 and provide gaps between the cube and circular recess for removing of the bait. The bait is of a plastic preferably with an imitation smell of chocolate or peanut butter or other suitable smell. The bottom of the actuator includes a reinforcing rib 48 extending essentially the length of the actuator. This rib 48 stiffens the actuator and may or may not be necessary depending upon the thickness of the actuator. The bottom surface of the actuator 40 includes a stop post 46 which extends downwardly from the bait recess 44 to maintain a certain angle of the actuator 40 as generally shown in FIGS. 4 and 5. This end position of the actuator is such that setting of the trap is easily accomplished, as the actuator will extend through the striker and present a rear surface which when depressed against the striker, will hold the striker in the set position. This set position is shown in FIGS. 2 and 3 with lip region 36 of the striker in engagement with lip region 52 of the actuator. It should be noted that lip region 52 of the actuator cooperates with a "V" shaped lip region 36 of the striker to provide line contact when in engagement as shown in FIG. 3. This increases the sensitivity. As the mouse enters the mouth of the trap adjacent the forward portion of the base 4, the actuator is upwardly angled and the mouse or rat, attracted by the prebait 38 or actual bait 39, depresses the actuator 40 causing the same to release the striker to rapidly move towards the floor portion of the base 20 killing the mouse or rat.

The base member 20 has an open back portion for allowing the rear portion 16 of the striker to freely move within the base. The back walls of the base generally shown as 30 have an notched area adjacent the torsion springs to allow one arm of the spring to extend beyond the shaft into engagement with the back wall 30 of the base, with the other arm of the spring overlying the top surface of the striker forward of the journals 8.

As can be appreciated from an review of FIGS. 2, 3 and 4, setting of the trap is extremely convenient. The rear portion 16 of the striker 4 is moved downwardly and adjacent the set position, the rear portion of the actuator 40 will pass through the slot-like opening 18. Once this has been completed, the person who will have gripped the striker with his thumb on the rearwardly extending tail portion 16 will merely shift his thumb somewhat depressing the rearward portion of the actuator 50 and letting up on the striker such that lip 36 of the striker comes into engagement with lip region 52 of the cooperating actuator. With the trap so set, the person can grab the upwardly extending side walls 28 of the base and finally locate the trap in its desired position. In this way, a person can actuate the trap with a single hand and is less likely to place his fingers between the striking edge 6 and edge 22 of the base portion. Furthermore, this arrangement allows convient opening of the trap for removal of a mouse, or rat at a remote position.

The trap as shown in the drawings is preferrably made of a molded plastic, with the exception of the torsion springs which are preferrably metal. This striker, the actuator and base are all separately molded pieces and basically snap-fit together. The trap is inexpensive to produce, easily set and not unduly complicated. It should be noted that the tail portion 16 of the striker 4 and the forward portion of the striker are downwardly angled from the axis defined by the journals 8. This results in a reduced angle through which the striker is rotated from its rest postion against the stop post 24 to its set position shown in FIG. 2, making it more convient for the user. It is preferred to have the angle of rotation less than about 60° and preferrably about 45°, although rotations of about 90° work satisfactorily.

Figure 6:
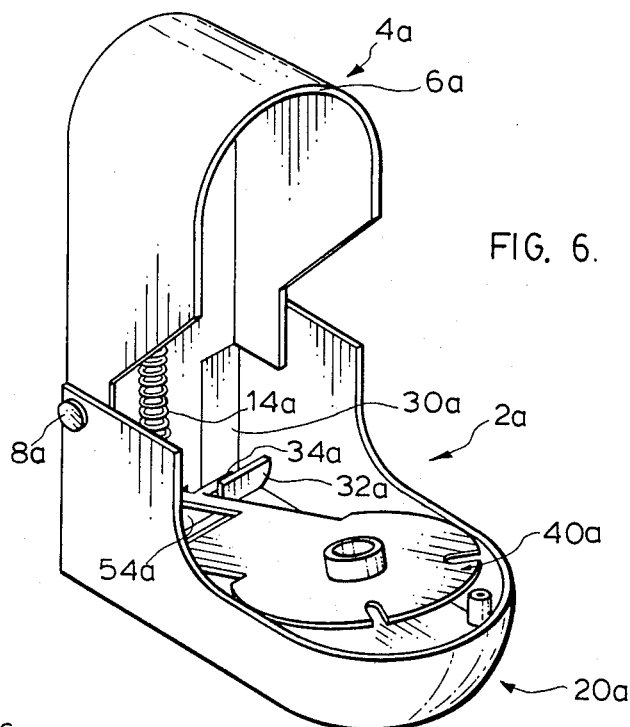
FIG. 6 is a perspective view of a modified version of the trap.

A modified version of the trap is shown in FIG. 6 where a helical extension spring, or longitudinally expanding type spring, is disposed between the base 20a and the striker 4a for urging the striker into a non-operative position, with edge 6a of the striker in engagement with, or in close proximity to, edge 22a of the base. The modified trap 2a has an actuator 40a having a front portion 42a, which will be depressed by the weight of a mouse when it seeks the bait within bait retainer 44a. The actuator is hinged to the base by stub shafts 34a which rotate within bearing type members 32a of the base.

Figure 7:
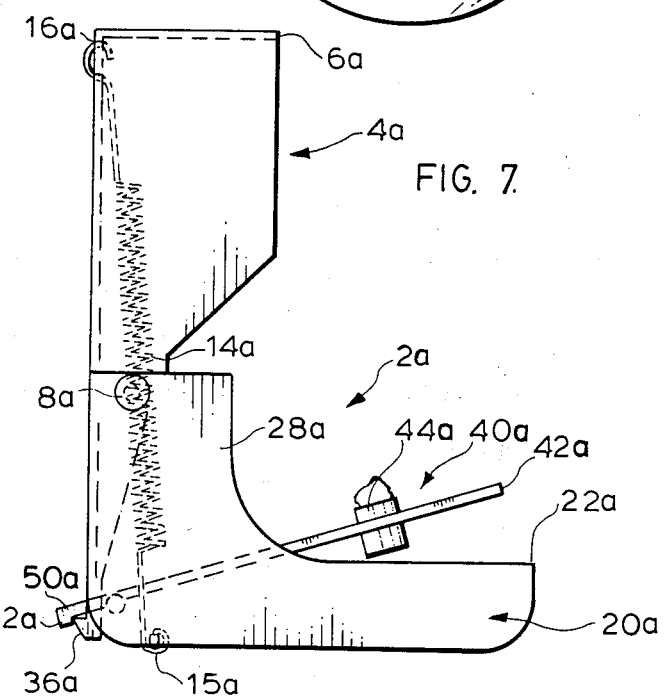
FIG. 7 is a side elevation of the modified trap.

As shown in the section of FIG. 7, the helical extension spring 14a is stretched as it is moved to the set position, generally shown in FIG. 7, and the securement of the spring to the striker at 16a and to the base at 15a generally aligns with the striker hinge axis defined by the journals 8a of the striker 4a received in the upper area of sidewalls 28a. In this configuration, the force exerted by the spring is generally along its length and as the journals are aligned with portion 15a and 16a, very little force is carried by the engaging lips defined by lip 36a of the striker and lip 52a of the actuator at the base of the trap. This arrangement improves the sensitivity of the trap as there is little resistance to the actuator being depressed by the weight of the mouse. The extension spring 14a only has a slight forward bias when generally in the set position, however, as the striker starts to move forwardly toward the forward portion of the base 20a, the component of the force in the vertical direction continues to increase and will accelerate the striker rapidly. This arrangement not only reduces loads carried by the engaging lips 36a and 52a, it also improves the ease in setting of the trap, in that, as portion 16a of the trap generally becomes aligned with portion 15a and journals 8a of the striker, the force required to maintain the striker in the set position is minimal as the major component of the spring force is carried by the journals and the base. Therefore, it becomes much easier to ensure that the actuator becomes engaged with the striker at the lower portion thereof merely by wiping the thumb of the person setting the trap over the rear of the actuator which is extended through a port provided in the striker.

Turning to FIG. 8, the motion generally indicated as 70 causing the actuator 40a to move downwardly, has allowed the rear portion of the striker to be released from lip 52a of the actuator and thus allow the spring to start to move the striker in the direction of arrow 72. As can be seen, the movement of the striker creates an increasing effective leverage arm as the striker moves towards the forward position and in the direction of arrow 72. Thus, the striker, after initially moving from generally the center position, will move rapidly toward the forward portion of the base under the influence of the spring 14a.

As shown in FIG. 6, the actuator includes a ported area 54a through which the extension spring 14a extends to engage the base 20a at position 15a. This ported area allows the actuator to freely move and also allows the spring to move as required to effect the desired movement of striker 14a.

Figure 10:
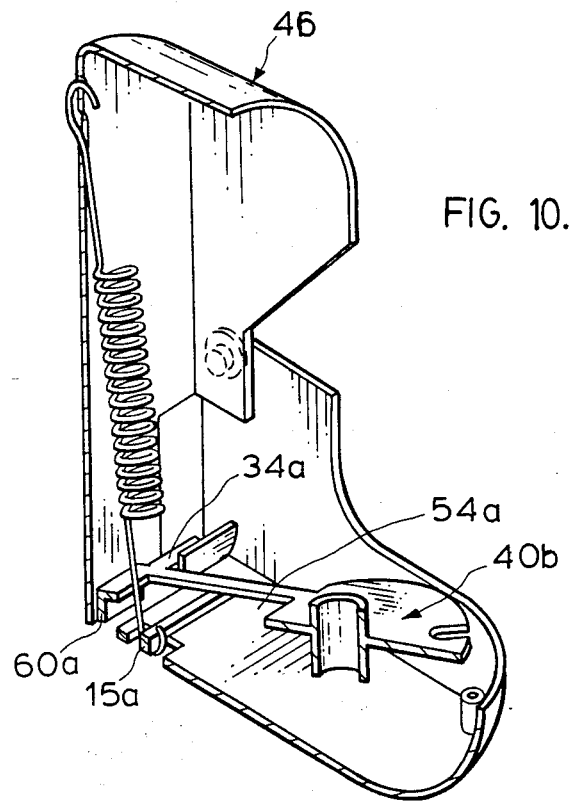
FIG. 10 is a perspective view of a vertical section of the trap.

A further modified version of the trap is shown in FIG. 10 where the actuator includes a downwardly extending flange 60a rearward of the stub shafts 34a, and this downwardly extending flange 60a acts both as a stop for the striker 4b and as a lever when the actuator is depressed for urging the striker through the center position such that the spring will cause the striker to move to the non-operative position.

Figure 11:
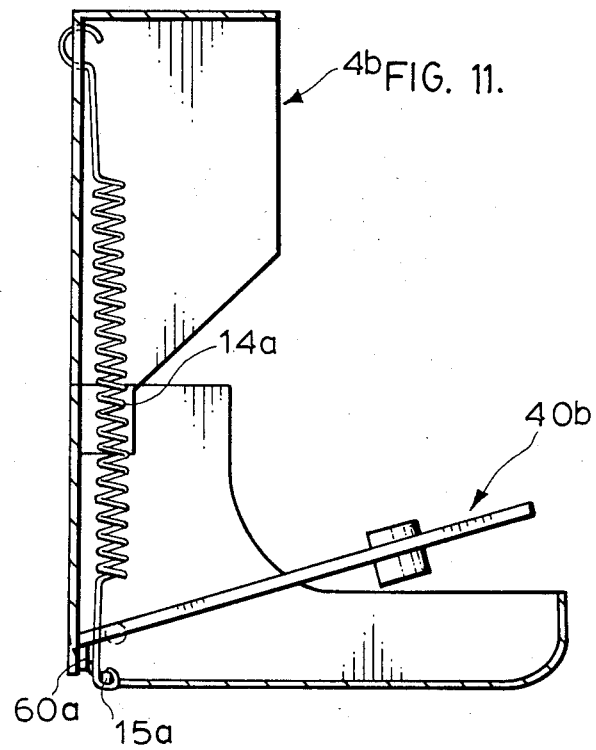
FIG. 11 is a side elevation of FIG. 10.

In the structure of FIG. 10, the striker 4b is moved past the aligned position such that extension spring 14a now serves to cause the striker to rotate about journals 8a and cause engagement of the rear portion of the striker with downwardly extending flange 60a. Thus, the spring causes the striker to be maintained in the set position as it is passed through the center position. In the set position, the front portion of actuator 40b is raised and when a mouse enters the trap and attempts to take the bait from the bait holder, the weight of the mouse will cause rotation of the actuator about stub shafts 34a, causing flange 60a to act as a lever and rotate the striker through the center position (very little additional force is required to effect the extension of the spring) whereupon the spring 14a now biases and accelerates the striker to the non-operative position. The details of the movement of the striker from the set position of FIG. 10 and 11 to the non-operative position can be appreciated from a review of FIG. 12, where flange 60b has caused the striker to move through the center position whereupon the spring urges the striker to the non-operative position.

FIG. 13 schematically shows the relationship between the striker 4b, the journals 8b, the base 20b and the extension spring 14a secured to the base at 15a and 16a. As can be seen, the striker 4b has been rotated such that a line drawn through point 15a and the center of journals 8b do not align with securement point 16a. In fact, point 16a has rotated through the center position such that spring 14a is now urging the striker in the direction of arrow 75. This relationship ensures that the striker is maintained in the set position and will be in engagement with the downwardly extending flange 60b which acts as stop for the striker and causes a raising of the forward portion of the striker.

In FIG. 14, the actuator (not shown) has caused the striker to move through the center position (point 16a is now forward of the point where the spring force is aligned with a line through 15a and journals 8b) and extension spring 14a now will rapidly move the striker to the non-operative position as indicated by arrow 77.

The modified trap of FIGS. 6 through 14 operate on the principle that the cooperation between the actuator and striker, which maintains the striker in the set position, results in a relatively low load placed on the lock mechanism to ensure greater sensitivity in the trap. This is accomplished as the extension spring goes through a position where substantially the major component of spring force is along a line defined by the journals of the striker and the point of securement of the spring to the base. Any components of the spring force in other directions, which are carried by the lock mechanism, are slight.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A trap of the type for killing mice or rats comprising a molded plastic base hingedly securing a striker at an elevated position adjacent an upper corner area of said base either side thereof, said striker being of a molded plastic and including journal means either side of said striker received in appropriately sized apertures in said base adjacent said upper corner areas, a helical extension spring secured at a forward portion of said striker and to said base at a position such that said forward portion, said journal means and said base portion are generally aligned when said striker is in a set position with said spring expanded for urging said striker to a non-operative position in engagement with a forward portion of said base, and actuator means hingedly secured to said base and movable to a position for maintaining said striker in said set position and when depressed moving to a non-maintaining position freeing said striker to move under the influence of said spring to said non-operative position and wherein said striker is movable past an aligned position such that said spring biases said striker away from said non-operative position and said actuator means maintaining said striker in said set position by providing a stop limiting movement of said striker and acting as a lever to urge, when depressed, said striker past the aligned configuration whereupon said spring causes said striker to move to the non-operative position.

2. A trap as claimed in claim 1, wherein said actuator is ported immediately forward of a hinge axis of said actuator through which said spring extends and engages said base.

3. A mouse trap comprising a base, a striker, an actuator and an extension spring means, said base pivotally supporting said striker at a raised position and pivotally supporting said actuator, said extension spring means normally biasing said striker to a closed position relative to said base with said extension spring means being extended by moving said striker from said closed position past a position of maximum spring extension to a set position, said actuator cooperating with said striker to move the same from the set position against the force of said spring to a position where said striker is moved rapidly under the influence of said spring means to said closed position and wherein movement of said striker to a set position causes said spring to, adjacent the set position, pass through the point of maximum spring extension, whereafter said spring biases said striker in a direction opposite to the direction biasing said striker to the closed position and wherein said actuator acts as a stop means for said striker at said set position.

4. A mouse trap as claimed in claim 3, wherein said striker cooperates with said actuator to bias said actuator to a set position when said striker is in a set position.

5. A mouse trap as claimed in claim 4, wherein said actuator also serves to provide said stop means for said striker.

6. A mouse trap as claimed in claim 5, wherein said actuator is pivotally supported intermediate its length and includes a forwardly extending bait receiving portion and a rearwardly extending portion which cooperates with said actuator to provide said stop means for said striker which, in turn, causes said actuator to move to a set position.

7. A mouse trap comprising a base, a striker, an actuator and an extension spring member, said base pivotally supporting said striker at a raised position, and pivotally supporting said actuator, said extension spring member being secured relative to said base and connected to said striker to cause extension of said spring member with movement of said striker to a set position and past a point of maximum extension of said spring, whereafter said spring biases said striker in a direction opposite to an initial direction, stop means integral with said actuator for limiting further movement of said striker at said set position where said spring member urges said striker into contact with said stop means and biases said actuator to an activated position, said actuator moving from the activated position to a release position due to the weight of a mouse acting on said actuator and causing said striker to move from the set position in sympathy with movement of said actuator past the point of maximum extension of said spring member, whereafter said spring member biases the set striker to a closed position.

8. A mouse trap as claimed in claim 7, wherein said extension spring member in said set position is approximately in line with the pivot point of said striker.

* * * * *